(12) United States Patent
Yamada et al.

(10) Patent No.: US 9,035,169 B2
(45) Date of Patent: May 19, 2015

(54) LAYERED COMPOUND-METAL PARTICLE COMPOSITE AND PRODUCTION METHOD THEREFOR, AND SUSPENSION, FILM AND FLEXIBLE SOLAR CELL USING SAME

(75) Inventors: Sunao Yamada, Fukuoka (JP); Masahi Ogawa, Fukuoka (JP); Takashi Kurihara, Fukuoka (JP); Kengo Ito, Fukuoka (JP)

(73) Assignee: KYUSHU UNIVERSITY, Fukuoka (JP)

( * ) Notice: Subject to any disclaimer, the term of this patent is extended or adjusted under 35 U.S.C. 154(b) by 98 days.

(21) Appl. No.: 13/985,193

(22) PCT Filed: Feb. 14, 2012

(86) PCT No.: PCT/JP2012/053341
§ 371 (c)(1),
(2), (4) Date: Dec. 6, 2013

(87) PCT Pub. No.: WO2012/111647
PCT Pub. Date: Aug. 23, 2012

(65) Prior Publication Data
US 2014/0076384 A1 Mar. 20, 2014

(30) Foreign Application Priority Data

Feb. 14, 2011 (JP) .................................. 2011-029216

(51) Int. Cl.
*H01G 9/20* (2006.01)
*C09C 1/42* (2006.01)
(Continued)

(52) U.S. Cl.
CPC ............. *H01G 9/2022* (2013.01); *Y02E 10/549* (2013.01); *C09C 1/42* (2013.01); *C09C 3/041* (2013.01); *C09C 3/08* (2013.01);
(Continued)

(58) Field of Classification Search
CPC ................................................... H01G 9/2022
USPC ........... 136/254; 428/403, 328, 212; 252/512, 252/514
See application file for complete search history.

(56) References Cited

U.S. PATENT DOCUMENTS 5,853,886 A * 12/1998 Pinnavaia et al. ............. 428/403
5,900,309 A *  5/1999 Kitamura et al. ............. 428/212
(Continued)

FOREIGN PATENT DOCUMENTS

CN        1750176 A     3/2006
JP        62-241880 A    10/1987
(Continued)

OTHER PUBLICATIONS

Ryuji Matsumoto, "Yuki Yozai Bunsanka Kin Nano Ryushi—Nendo Fukogotai no Sakusei to Kogaku Tokusei," CSJ: The Chemical Society of Japan Koen Yokoshu, Mar. 11, 2011, vol. 91, pp. 934.

(Continued)

*Primary Examiner* — Golam Mowla
(74) *Attorney, Agent, or Firm* — Lowe Hauptman & Ham, LLP

(57) ABSTRACT

A layered compound-metal particle composite 3 is obtained by the addition, to an organically modified layered compound 1 formed by the intercalation of organic ions between layers of a layered compound, of both an aqueous colloidal metal solution 2 in which metal particles are dispersed as a metal colloid in water, and a nonaqueous solvent which is a poor solvent for the metal colloid and has an excellent ability to swell the organically modified layered compound 1.

20 Claims, 9 Drawing Sheets

(51) Int. Cl.
*C01B 33/44* (2006.01)
*B22F 1/00* (2006.01)
*B82Y 30/00* (2011.01)
*C09C 3/04* (2006.01)
*C09C 3/08* (2006.01)

(52) U.S. Cl.
CPC ........ *C01P 2002/82* (2013.01); *C01P 2006/40* (2013.01); *C01B 33/44* (2013.01); *Y02E 10/542* (2013.01); *C01P 2004/04* (2013.01); *B22F 1/0018* (2013.01); *B82Y 30/00* (2013.01)

(56) References Cited

U.S. PATENT DOCUMENTS

| | | | | |
|---|---|---|---|---|
| 6,117,541 | A * | 9/2000 | Frisk | 428/327 |
| 2005/0255320 | A1* | 11/2005 | Noguchi | 428/403 |
| 2008/0206567 | A1* | 8/2008 | Min et al. | 428/404 |
| 2009/0286023 | A1* | 11/2009 | Dobreski et al. | 428/34.8 |

FOREIGN PATENT DOCUMENTS

| | | |
|---|---|---|
| JP | 10-182142 A | 7/1998 |
| JP | 11-33088 A | 2/1999 |
| JP | 11-61209 A | 3/1999 |
| JP | 2003-62462 A | 3/2003 |
| JP | 2005-255419 A | 9/2005 |
| JP | 2006-184247 A | 7/2006 |

OTHER PUBLICATIONS

Corresponding International PCT/JP2012/053341 Search Report dated May 1, 2012.
Office Action dated Oct. 21, 2014, corresponding to Chinese patent application No. 201280018173.5.
International Preliminary Report on Patentability dated Sep. 19, 2013, corresponds to PCT/JP2012/053341.

* cited by examiner

Mediator: ELECTRON ACCEPTOR (METHYL VIOLOGEN)
Polyelectrolyte: POLYMER ELECTROLYTE (HYDROPHILIC CLAY)

Fig.17

| | Aqueous colloidal metal solution (A) | Layered compound | Nonaqueous solvent (B) | Amphiphatic solvent (C) | Order of addition | SP difference | Formation of composite | Recovery of composite |
|---|---|---|---|---|---|---|---|---|
| Example 1 | gold nanoparticles (55 to 60 nm) | lipophilized smectite SPN | ethyl acetate | ethanol | C→B→A | 26.4 | good | moved to organic phase |
| Example 2 | gold nanoparticles (20±2 nm) | lipophilized smectite SPN | ethyl acetate | ethanol | C→B→A | 26.4 | good | moved to organic phase |
| Example 3 | gold nanoparticles (20±2 nm) | lipophilized smectite SPN | ethyl acetate | ethanol | C→A→B | 26.4 | good | moved to organic phase |
| Example 4 | gold nanoparticles (20±2 nm) | lipophilized smectite SAN | toluene | --- | B→A | 26.8 | good | moved to organic phase |
| Example 5 | silver nanoparticles (50 nm) | lipophilized smectite STN | acetone | --- | B→A | 24.7 | good | precipitated |
| Example 6 | silver nanoparticles (50 nm) | lipophilized smectite SAN | toluene | --- | B→A | 26.8 | good | moved to organic phase |
| Example 7 | silver nanoparticles (50 nm) | lipophilized montmorillonite | acetone | --- | B→A | 24.7 | good | precipitated |
| Example 8 | silver nanoparticles (50 nm) | lipophilized synthetic mica | acetone | --- | B→A | 24.7 | good | precipitated |
| Example 10 | gold nanoparticles (20±2 nm) | lipophilized smectite SAN | toluene | --- | B→A | 26.8 | good | film formed at interface |
| Example 12 | silver nanoparticles (50 nm) | lipophilized smectite SAN | toluene | --- | B→A | 26.8 | good | film formed at interface |
| Comp. Ex. 1 | gold nanoparticles (20±2 nm) | smectite SWN | ethyl acetate | ethanol | C→B→A | 26.4 | NG | --- |
| Comp. Ex. 2 | silver nanoparticles (50 nm) | smectite SWN | acetone | --- | B→A | 24.7 | NG | --- |
| Comp. Ex. 3 | gold nanoparticles (20±2 nm) | --- | toluene | --- | B→A | --- | NG | --- |

LAYERED COMPOUND-METAL PARTICLE COMPOSITE AND PRODUCTION METHOD THEREFOR, AND SUSPENSION, FILM AND FLEXIBLE SOLAR CELL USING SAME

RELATED APPLICATIONS

The present application is based on, and claims priority from, International Application Number PCT/JP2012/053341 and Japanese Application Number JP 2011-029216, filed Feb. 14, 2011, the disclosure of which is hereby incorporated by reference herein in its entirety.

TECHNICAL FIELD

The present invention relates to a layered compound-metal particle composite and to a method of producing such a composite. The invention further relates to a layered compound-metal particle composite suspension and to a layered compound-metal particle composite thin-film and a flexible solar cell using the same.

BACKGROUND ART

Efforts have hitherto been made to use composites of fine metal particles and clay-based layered compounds in sensors.

For example, Patent Document 1 discloses technology in which a composite obtained by causing precious metal nanoparticles to aggregate within a fluid matrix such as smectite and stabilizing the aggregated state is used as a surface-enhanced Raman scattering (SERS) matrix in Raman spectroscopy that employs surface-enhancing Raman scattering. By stabilizing the aggregated state of precious metal nanoparticles within the liquid matrix, detection having a good reproducibility becomes possible.

Known methods for producing such composites includes the techniques of obtaining a composite sol (composite) of fine precious metal particles and fine plate-like particles by inducing the formation of fine precious metal particles within a dispersion of fine plate-like particles of smectite or the like dispersed in an aqueous solution or a highly polar solvent (see Patent Documents 2 and 3).

Patent Document 1: Japanese Patent Application Laid-open No. 2006-184247
Patent Document 2: Japanese Patent Application Laid-open No. H11-61209
Patent Document 3: Japanese Patent Application Laid-open No. H10-182142

However, montmorillonite group minerals (smectite, etc.), which are a leading type of clay-based layered compounds, have a layered structure created by the repetition of a three-layer structure in which a regular octahedron serves as the basic skeleton, and contain alkali metal ions as exchangeable anions between the layers. Moreover, because montmorillonite group minerals are generally hydrophilic at the surface and between the layers, they have an excellent affinity to highly polar substances such as water, dimethyl formamide and other polar solvents. On the other hand, they lack affinity with low-polarity substances such as toluene, ketone-type solvents and other solvents having a low polarity.

Therefore, although layered compound-metal particle composites having an affinity to highly polar substances can be obtained by the methods described in Patent Documents 2 and 3, obtaining layered compound-metal particle composites having an affinity to low-polarity substances is difficult.

Hence, such methods cannot be employed as film-forming processes of excellent productivity that involve dispersing a layered compound-metal particle composite in an organic solvent having an excellent volatility and low polarity to form a paste, then coating the paste onto a substrate to fabricate a desired device. Those cases in particular where a multilayer structure is produced by printing or coating the above paste present challenges in terms of work efficiency and economy.

Moreover, because layered compound-metal particle composites obtained by the methods described in Patent Documents 2 and 3 lack affinity with low-polarity substances, this becomes a problem in cases where device fabrication entails combining the layered compound-metal particle composite with an organic substance, thus limiting the application of such composites.

For example, in a case where a layered compound-metal particle composite is dispersed in the bulk heterolayer of an organic solar cell, and the photoelectric conversion ratio is enhanced by the plasmonic functionality of the metal nanoparticles, if there is no affinity between the organic semiconductor making up the bulk heterolayer and the layered compound-metal particle composite, the metal nanoparticles have difficulty approaching the bulk heterojunctions, making an adequate photoelectric conversion-improving effect impossible to obtain. Accordingly, introducing layered compound-metal particle composites obtained by the methods of Patent Documents 2 and 3 into the bulk heterolayer of an organic solar cell for the sake of improving photoelectric conversion is difficult.

For similar reasons, employing layered compound-metal particle composites obtained by the methods of Patent Documents 2 and 3 as electrode materials for electrical double-layer capacitors which use nonaqueous solvents such as ionic liquids is also difficult.

DISCLOSURE OF THE INVENTION

It is therefore an object of the invention to provide a layered compound-metal particle composite having excellent affinity with low-polarity substances. A further object is to provide a method of manufacturing such a composite. Still further objects are to provide a coating, an applied coat, and an electronic device and a photoelectric conversion device, as well as a method for controlling the performances thereof, all of which entail the use of such a composite.

The inventors initially attempted to apply the techniques of Patent Documents 2 and 3 for producing a layered compound-metal particle composite within a homogeneous liquid phase using an aqueous solution or a highly polar solvent in order to create a composite of an organically modified layered compound lipophilized by the intercalation of organic ions and a metal colloid within a homogeneous phase composed of a nonaqueous solvent. That is, in order to bring a metal colloid which is hydrophilic and an organically modified layered compound which is hydrophobic into mutual contact within a homogeneous phase so as to form a composite, a solvent that has a relatively high polarity and is compatible with water was mixed with an aqueous colloidal metal solution, and the organically modified layered compound was added to this mixed liquid. However, contrary to expectations, although the metal colloid and the organically modified layered compound are both present within the mixed solvent, it was found that the composite does not form; instead, the components each maintain independently stable states.

As a result of extensive investigations, the inventors have discovered that a layered compound-metal particle composite having an excellent affinity to low-polarity substances can be obtained by adding, to an organically modified layered compound that has been lipophilized by the intercalation of organic ions, an aqueous colloidal metal solution and a nonaqueous solvent which is a poor solvent for the metal colloid and has an excellent ability to swell the organically modified layered compound. In particular, the inventors have found that when a nonaqueous solvent having such a low polarity as to be incompatible with water is used, although the aqueous phase within which the metal colloid is dispersed and the organic phase (nonaqueous solvent) within which the organically modified layered compound is dispersed enter into a phase-separated state, surprisingly, formation of a composite of the metal colloid and the organically modified layered compound proceeds at the interface between the aqueous phase and the organic phase, and the resulting composite moves into the organic phase.

This phenomenon presumably occurs for the following reasons. The organically modified layered compound, due to the intercalation of organic ions, is modified so as to become hydrophobic and also acquires from the organic ions an excessive charge at the surface and between layers. At the same time, the metal colloid contained within the aqueous colloidal metal solution is generally surface-modified with citric acid or the like to increase its affinity to water. The surface of the metal colloid, depending on the place, exhibits hydrophobic properties inherent to the metal particles, or exhibits hydrophilic properties owing to hydrophilic groups on the surface modifier. As a result, it appears that hydrophobic interactions or electrostatic interactions occur between the metal colloid and the organically modified layered compound, leading to the formation of a composite of the metal colloid and the organically modified layered compound.

The inventive method of producing a layered compound-metal particle composite, which is based on the above findings by the inventors, is a method of producing a composite of a layered compound and metal particles which is characterized by including the steps of: forming an organically modified layered compound by intercalating organic ions between layers of the layered compound; and adding to the organically modified layered compound an aqueous colloidal metal solution in which the metal particles are dispersed as a metal colloid in water and a nonaqueous solvent which is a poor solvent for the metal colloid and has an excellent ability to swell the organically modified layered compound.

In this method of producing a layered compound-metal particle composite, by using a nonaqueous solvent which is a poor solvent for the metal colloid and has an excellent ability to swell the organically modified layered compound, the formation of a composite of an organically modified layered compound lipophilized by the intercalation of organic ions and the metal colloid in the aqueous colloidal metal solution can be made to proceed. As a result, a layered compound-metal particle composite having an excellent affinity to low-polarity substances is obtained.

In the above method of producing a layered compound-metal particle composite, the nonaqueous solvent has a solubility parameter (SP) difference with the metal colloid of preferably at least 9 $MPa^{1/2}$, more preferably at least 13 $Pa^{1/2}$, and even more preferably at least 21 $MPa^{1/2}$.

By thus using a nonaqueous solvent having a sufficiently low solubility for the metal colloid, the formation of a composite between the organically modified layered compound and the metal colloid can be more reliability made to proceed.

In the above method of producing a layered compound-metal particle composite, in addition to the nonaqueous solvent and the aqueous colloidal metal solution, it is preferable to also add to the organically modified layered compound an amphiphatic solvent having excellent affinity to both the water acting as a solvent in the aqueous colloidal metal solution and to the nonaqueous solvent.

By using an amphiphatic solvent, the frequency of contact between the metal colloid having a high affinity to water and the organically modified layered compound having a high affinity to nonaqueous solvents is increased, enabling the formation of a composite of the metal colloid and the organically modified layered compound to be promoted.

In this case, it is preferable for the nonaqueous solvent to have a lower dielectric constant than the amphiphatic solvent. The formation of a composite of the organically modified layered compound and the metal colloid can thus be made to more reliably proceed.

In the above method of producing a layered compound-metal particle composite, the metal particles may include at least one from among gold, silver, copper, aluminum and platinum.

Moreover, organic cations or organic anions of any structure may be used as the organic ions. More specifically, the organic ions may be of at least one type from among sparingly water-soluble or water-insoluble quaternary ammonium salts, phosphonium salts, fluorescent cationic dyes and oxonium salts.

Also, the layered compound is not particularly limited, provided it is a layered compound having exchangeable ions between the layers. For example, preferred use may be made of a layered clay compound belonging to the montmorillonite group of minerals or the mica group.

The layered compound-metal particle composite according to the invention is characterized by being obtained by the above-described production method.

Because the layered compound-metal particle composite obtained by the above production method has an excellent affinity to low-polarity substances, when dispersed in a low-polarity solvent of excellent volatility to form a paste, it can be incorporated into a desired device through the use of a film-forming method of excellent work efficiency and economy, such as printing or coating. Moreover, because it has an excellent affinity to low-polarity substances, this layered compound-metal particle composite can be combined with an organic substance to obtain devices having a variety of functions.

The layered compound-metal particle composite suspension according to the invention is characterized by including the above-described layered compound-metal particle composite and an organic solvent as a dispersion medium for the layered compound-metal particle composite.

In this layered compound-metal particle-composite suspension, because a layered compound-metal particle composite having an excellent affinity with a low-polarity substance is dispersed within an organic solvent as described above, a suspension in which the composite has been stably dispersed is obtained.

The organic solvent used as the dispersion medium may be the "nonaqueous solvent" that was used when forming the above layered compound-metal particle composite.

The above layered compound-metal particle composite suspension may further include at least one from among an organic dye, a hole transporting material, a p-type semiconductive material, an electron transporting material, an n-type semiconductive material and a crosslinkable material.

By including an organic dye, a hole transporting material, a p-type semiconductive material, an electron transporting material or an n-type semiconductive material in the suspension, it is possible to form functional films having various functionalities. And by including a crosslinkable material, the strength of the functional film that has been formed can be enhanced.

The layered compound-metal particle composite thin-film of the invention is characterized in that it is obtained by coating a surface thereof with the above layered compound-metal particle composite suspension.

Also, the layered compound-metal particle composite multilayer functional film of the invention is characterized by being composed of a stack of layers which include a plurality of the layered compound-metal particle composite thin-films, the plurality of layered compound-metal particle composite thin films having mutually differing properties.

By thus stacking together a plurality of layered compound-metal particle composite thin-films of differing properties, various functionalities can be achieved.

The above layered compound-metal particle composite multilayer functional film may include an insulating layer composed of a layered compound-metal particle composite thin-film having a surface resistance of at least 100 k$\Omega$/, a pair of dielectric layers composed of layered compound-metal particle composite thin-films having a surface resistance of at least 1 k$\Omega$/ but less than 100 k$\Omega$/ and disposed, respectively, on a surface side and a back side of the insulating layer, and current-collecting electrode layers composed of layered compound-metal particle composite thin-films having a surface resistance of not more than 10$\Omega$/ and disposed as surfacemost layers.

In this arrangement, because the dielectric layers stacked on both sides of the insulating layer act as polarizable electrodes and the surfacemost current-collecting electrode layers act as current-collecting electrodes, the multilayer functional film as a whole manifests the functionality of a capacitor. By additionally combining therewith an electrolytic solution containing an electrolyte, use as an electrical double layer type capacitor (a large-capacity capacitor) is also possible.

A dye for photoelectric conversion may be added to one of the current-collecting electrode layers and a layer adjacent thereto. In this case, use as a novel light-inducible electrical double-layer type capacitor is possible.

The layered compound-metal particle composite multilayer functional film can thereby be utilized in devices which employ the phenomenon of photoelectric conversion, such as solar cells and water photolysis devices. In cases where the layered compound-metal particle composite multilayer functional film is utilized in a water photolysis device, an electron acceptor that is photoreduced by the dye may be added to the insulating layer (the insulating layer provided between the polarizable electrodes) or to the insulating layer and the dielectric layers.

The layered compound-metal particle composite multilayer functional film may have a symmetrical layered structure divided by the insulating layer, and may have added thereto two photoelectric conversion dyes having spectral sensitivities or light absorption wavelength maxima mutually differing by at least 20 nm, one dye being added to one of the current-collecting electrode layers and a layer adjacent thereto, and the other dye being added to the other current-collecting electrode layer and a layer adjacent thereto.

By thus using dyes of differing spectral sensitivities or differing light absorption wavelength maxima, a photoredox reaction process involving the absorption of two photons which is similar to photosynthesis is made to proceed, enabling a water photolysis function to be achieved.

In this case, the layered compound-metal particle composite multilayer functional film stacked on one side of the insulating layer may include platinum particles as the metal particles, and the layered compound-metal particle composite multilayer functional film stacked on the other side of the insulating layer may include particles of at least one of gold, silver, copper and aluminum.

By thus placing platinum having a water reducing potential on the (photo)reducing side and placing a plasmonic metal species (gold, silver, copper, aluminum) having a work function differing from that of platinum on the (photo)oxidation side, water photolysis can be reliably carried out.

The flexible solar cell according to the invention may have a first electrode which is a dielectric layer or a solid electrolyte layer composed of the above-described layered compound-metal particle composite multilayer functional film and has a metal particle content of less than 50 wt %, and a second electrode which is a carbon fiber electrode. That is, in order to have one electrode with the plasmon enhancing effect of metal particles function as a light input side electrode, it is not always necessary to have the other electrode be light transmitting. It is thus possible to deliberately introduce electrode materials in which properties such as low cost, flexibility and electrical conductivity have been improved to at least the same level as in the conventional art. Such electrode materials are exemplified by carbon fiber electrodes. These offer the advantages of helping to achieve a flexible stack and being inexpensive, in addition to which the electrode surface area owing to the fiber structure is overwhelmingly larger than that of a flat plate, facilitating the flow of electrical current. Moreover, because carbon fiber electrodes are light-absorbing black bodies, they are also beneficial on account of their ability to effectively utilize heat (infrared light). Of course, any type of electrode such as aluminum foil may be used instead of a carbon fiber electrode.

Also, in the two photon absorption-type photoredox mechanism exhibited in a water photolysis device, because it is necessary to utilize the plasmon enhancement effect of the metal particles in both electrodes, two electrodes composed of the above-described layered compound-metal particle composite of the invention having different light transmittances can be used in an arrangement that includes a dielectric layer or a solid electrolyte therebetween. By suitably selecting the thicknesses of the materials from which both electrodes and the dielectric layer or the solid electrolyte are made, it is also possible to confer the device with flexibility.

The inventive composite, a paste which is a high-concentration dispersion thereof, and a thin film and a stacked structure of two or more thin-films formed from the paste are characterized by being composed of metal particles and an inorganic material or an inorganic-organic hybrid compound that adsorbs the metal particles and being able to maintain a dispersed state within a nonaqueous solvent.

The electrical conductivities, plasmon resonances or optical absorption characteristics thereof are controlled in accordance with the content and degree of aggregation of the metal particles.

This invention, by using a nonaqueous solvent which is a poor solvent for metal colloid and has an excellent ability to swell organically-modified layered compound, is able to bring about the formation of a composite of an organically modified layered compound that has been lipophilized by the intercalation of organic ions and the metal colloid in an aqueous colloidal metal solution. As a result, a layered compound-metal particle composite having excellent affinity with low-polarity substances is obtained.

BRIEF DESCRIPTION OF THE DRAWINGS

FIG. 17 is a table showing the relationship between the composite formation conditions and the composite forming phenomena for the working examples and comparative examples in which layered compound-metal particles composites were produced.

BEST MODE FOR CARRYING OUT THE INVENTION

[First Embodiment]

Figure 1:
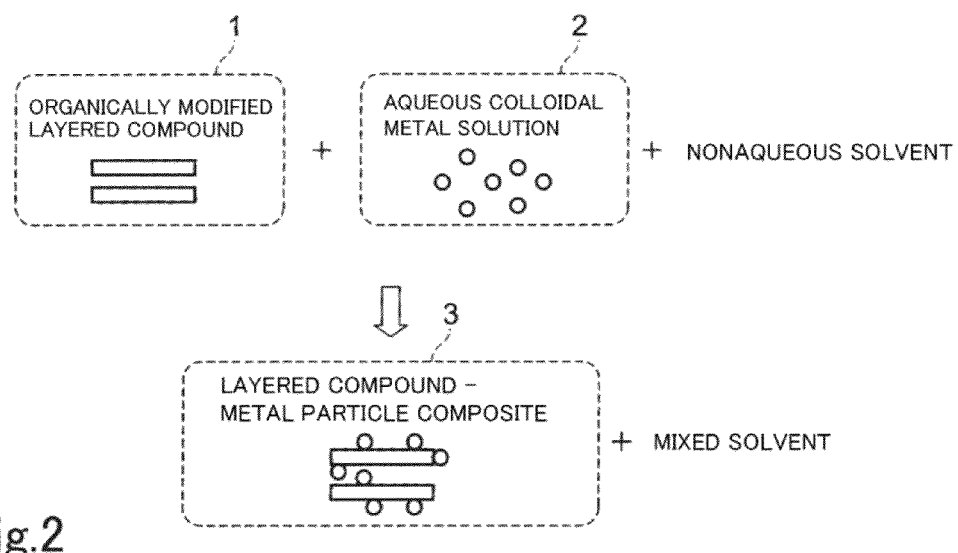
FIG. 1 is a diagram showing the method of producing a layered compound-metal particle composite according to a first embodiment of the invention.

First, the method of producing a layered compound-metal particle composite according to a first embodiment of the invention is described. FIG. 1 is a diagram showing the method of producing a layered compound-metal particle composite according to the first embodiment.

In this embodiment, as shown in FIG. 1, an aqueous colloidal metal solution 2 and a nonaqueous solvent are added to an organically modified layered compound 1 which has been lipophilized by the intercalation of organic ions between the layers, thereby forming a layered compound-metal particle composite 3 having an excellent affinity with low-polarity substances.

The layered compound prior to lipophilization of the organically modified layered compound 1 is not particularly limited, provided it is a layered compound having exchangeable ions between the layers. For example layered clay compounds belonging to the montmorillonite group of minerals or the mica group may be advantageously used. The montmorillonite group of minerals are clay minerals of the following general formula $(X,Y)_{2-3}Z_4O_{10}(OH)_2 \cdot mH_2O \cdot (W_{1/3})$ (wherein X is Al, Fe(III), Mn(III) or Cn(III); Y is Mg, Fe(II), Mn(II), Ni, Zn or Li; Z is Si or Al; W is K, Na or Ca; $H_2O$ is interlayer water; and m is an integer). Here, depending the combination of X and Y and the substitution number, many such compounds, including montmorillonite, magnesian montmorillonite, iron montmorillonite, iron magnesian montmorillonite, beidellite, aluminian beidellite, nontronite, aluminian nontronite, saponite, aluminian saponite, hectorite and sorconite, exist as natural products. In addition to these natural products, synthetic products in which OH groups within the above formula are substituted with halogens such as fluorine are also commercially available. Any of these may be used.

Organic cations or organic anions of any structure may be used as the organic ions for lipophilizing the organically modified layered compound 1, and are exemplified by onium salts such as quaternary ammonium salts, phosphonium salts, fluorescent cation dyes or oxonium salts which are sparingly soluble or insoluble in water. More specifically, preferred use may be made of quaternary ammonium salts having bulky cations with four alkyl groups of four or more carbons, phosphonium salts having bulky cations such as alkylphosphonium ions and arylphosphonium ions, and oxonium salts having bulky cations as counterions of perchlorate anions.

The aqueous colloidal metal solution 2 is a dispersed system composed of a metal colloid (metal particles or metal particles whose surfaces are at least partially covered with a dispersant such as citric acid) dispersed within water as the dispersion medium. The type of metal, particle diameter and shape of the metal particles may be suitably selected so as to manifest the desired function. For example, metals such as gold, silver, copper, aluminum and platinum may be used, particle diameters within a range of from several nanometers to several hundreds of nanometers may be selected, and particle shapes such as a spherical or rod shape may be selected.

The nonaqueous solvent used is a solvent which is a poor solvent for the metal colloid within the aqueous colloidal metal solution 2, and has an excellent ability to swell the organically modified layered compound 1. Specifically, a solvent having a sufficiently large difference in solubility parameter (SP) with the metal colloid may be used as the nonaqueous solvent.

The SP difference between the metal colloid and the nonaqueous solvent is preferably at least 9 $MPa^{1/2}$, more preferably at least 13 $MPa^{1/2}$, and even more preferably at least 21 $MPa^{1/2}$. By thus using a nonaqueous solvent with a sufficiently low solubility for the metal colloid, the formation of a composite of the organically modified layered compound 1 and the metal colloid can be made to proceed more reliably.

In the layered compound-metal particle composite production method of this embodiment, by using a nonaqueous solvent which is a poor solvent for the metal colloid and has an excellent ability to swell the organically modified layered compound 1, it is possible to induce the formation of a composite of the organically modified layered compound 1 lipophilized by the intercalation of organic ions and the metal colloid in the aqueous colloidal metal solution 2. A layered compound-metal particle composite 3 having an excellent affinity with low-polarity substances can thereby be obtained.

Because the layered compound-metal particle composite 3 exhibits a high dispersion stability in nonaqueous solvents, it can be furnished in the form of suspensions (including pastes) in which a nonaqueous solvent serves as the dispersion medium. In addition, various functional materials can be formed using the layered compound-metal particle composite 3 or a suspension thereof. For example, there is the obvious use as color materials having a high degree of durability, and use as sensitized thin-films for solar cells, CCD sensors or LPR sensors based on plasmonics, and in electronic devices such as capacitors or electrode materials is also possible. Furthermore, the combination of such composites or suspensions with sensitizers and electron transporting functions similar to photosynthesis will likely lead to the creation of practical electrical storage devices and water photolysis devices which put to use the photoredox effects of these composites or suspensions.

In cases where ethyl acetate or toluene, both of which have very low polarities, is used as the nonaqueous solvent, there is a tendency for one of the following effects to arise: either the mixed solvent of the aqueous colloidal metal solution 2 and the nonaqueous solvent phase-separates into an aqueous phase and an organic phase, and the composite moves into the organic phase, or a condensed layer of the composite forms between the aqueous phase and the organic phase. On the other hand, when acetone and ethanol, which have high polarities compared with ethyl acetate and toluene, are used as the nonaqueous solvent, phase separation of the mixed solvent of the aqueous colloidal metal solution and the nonaqueous solvent is not observed; instead, precipitation of the composite tends to arise.

In the former case, a suspension having the desired composite concentration (such as a paste or a dilution) can be obtained either by separating the organic phase in which the composite is dispersed from the aqueous phase, or by removing the condensed layer of composite between the aqueous phase and the organic phase and dispersing it in an organic solvent. If the composite is extracted into an organic phase, it may not be possible to obtain a suspension having a sufficient composite concentration in a single extraction operation. If this is the case, after the organic phase into which the composite has been extracted is separated from the aqueous phase, the composite can be concentrated by once again adding aqueous colloidal metal solution and causing the metal colloid to move into the organic phase. The extraction operation may be repeated as many times as needed.

In the latter case, a suspension having the desired composite concentration (such as a paste or a dilution) can be obtained by dispersing in an organic solvent the composite that has settled and precipitated out.

[Second Embodiment]

Figure 2:
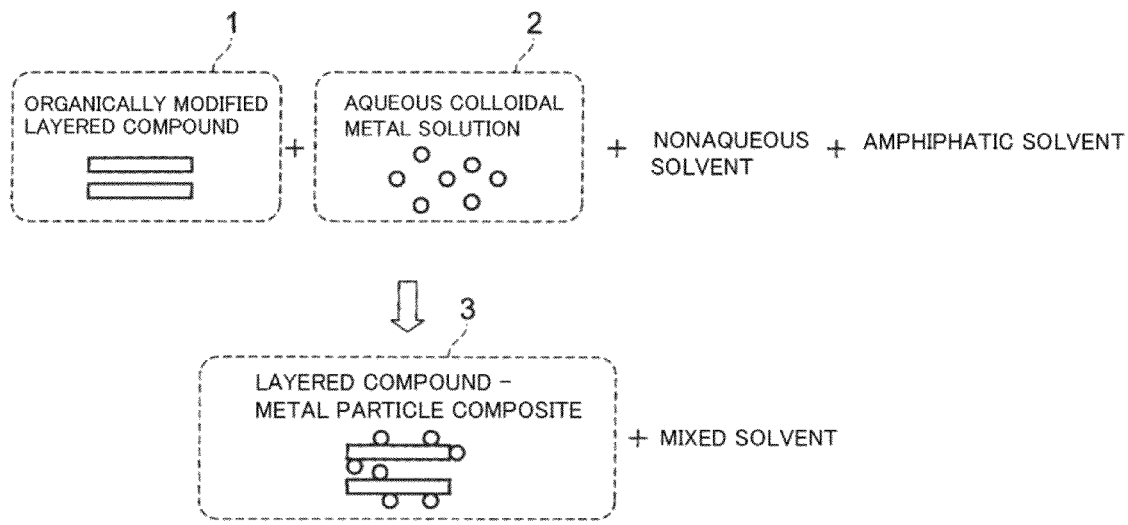
FIG. 2 is a diagram showing the method of producing a layered compound-metal particle composite according to second embodiment of the invention.

Next, a layered compound-metal particle composite production method according to a second embodiment of the invention is described. FIG. 2 is a diagram showing the method of producing a layered compound-metal particle composite according to the second embodiment. This embodiment, aside from the further addition of an amphiphatic solvent differing from the nonaqueous solvent, is the same as the first embodiment. Hence, the explanation given below describes primarily those features of the second embodiment which differ from the first embodiment and omits those features in common with the first embodiment.

As shown in FIG. 2, in the present embodiment, an organically modified layered compound 1 has added thereto not only an aqueous colloidal metal solution 2 and a nonaqueous solvent, but also an amphiphatic solvent.

By thus using an amphiphatic solvent, the frequency of contact between the metal colloid having a high affinity with water and the organically modified layered compound 1 having a high affinity with the nonaqueous solvent is increased, making it possible to promote the formation of a composite of the metal colloid and the organically modified layered compound 1.

A solvent having an excellent affinity to both the water serving as the solvent in the aqueous colloidal metal solution 2 and to a nonaqueous solvent is used as the amphiphatic solvent. Specifically, preferred use can be made of a solvent having a dielectric constant which is smaller than that of water and larger than that of the nonaqueous solvent. For example, in cases where the nonaqueous solvent is acetone, ethyl acetate, toluene or the like, methanol or ethanol may be used as the amphiphatic solvent.

Embodiments of the invention have been described above in detail. However, the invention is not limited to these embodiments, and various modifications and variations are possible insofar as they do not depart from the gist of the invention.

EXAMPLES

Example 1

A layered compound-metal particle composite was produced as described below by a method according to the above embodiments.

Figure 3:
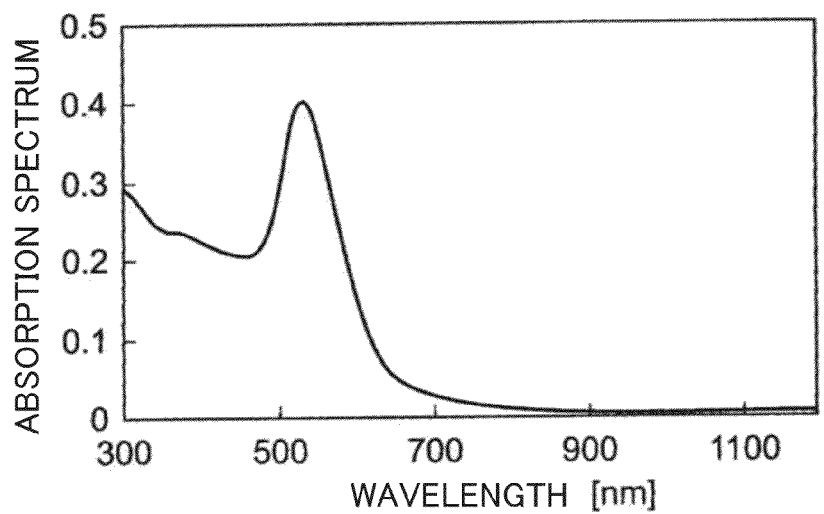
FIG. 3 is a graph showing the transmission/absorption spectrum measured for the aqueous metal nanocolloid solution in Example 1.

First, an aqueous gold nanocolloid solution was prepared as follows in accordance with a reference document (G. Frens et al., *Nat. Phys. Sci.* (1973)). Next, 6 mL of $HAuCl_4 \cdot 4H_2O$ (1 wt %) was dissolved in 594 mL of ultrapure water and refluxed under heating. After boiling, 4.92 mL of a 1 wt % aqueous solution of trisodium citrate was added and refluxing was continued. The solution changed in color from light-yellow to red. After one hour, refluxing was stopped and the solution was allowed to cool naturally, following which it was stored under darkened conditions at room temperature. The transmission/absorption spectrum of the aqueous gold nanocolloid solution thus obtained was measured, yielding the results shown in FIG. 3. Because the plasmon absorption according to the transmission/absorption spectrum measured was 534 nm, the diameter of the gold nanoparticles was assumed to be about 55 to 60 nm.

Figure 4:
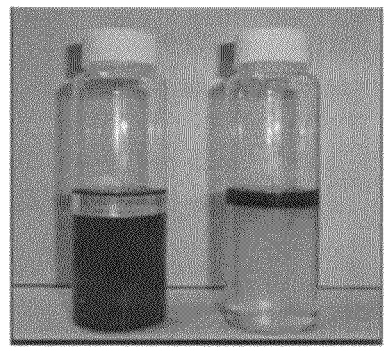
FIG. 4 is a photograph showing the manner in which a gold colloid moved from an aqueous phase into an organic phase in Example 1.

Next, 0.15 mL of a 1 wt % ethanol solution of lipophilized synthetic smectite SPN available from CO-OP CHEMICAL CO., LTD. was collected in a 100 mL screw-top vial. To this was added 10 mL of ethyl acetate, and dispersion was effected by ultrasonic irradiation. Upon adding 50 mL of the above aqueous gold nanocolloid solution to this dispersion, a liquid which separated into 50 mL of an aqueous phase composed primarily of water and 10 mL of an organic phase composed primarily of ethyl acetate (left-hand vial in FIG. 4) was obtained. The aqueous phase at this time was red, whereas the organic phase was clear. This liquid was vigorously stirred for 30 seconds and left at rest for 10 minutes, whereupon the organic phase became red in color and the aqueous phase became clear (right-hand vial in FIG. 4). From the change in the colors of the respective phases, even though the amount of solvent was smaller in the organic phase (10 mL) than in the aqueous phase (50 mL), it was confirmed that, due to stirring following addition of the aqueous gold nanocolloid solution in the presence of ethyl acetate, most of the gold colloid moved from the aqueous phase to the organic phase.

Figure 5:
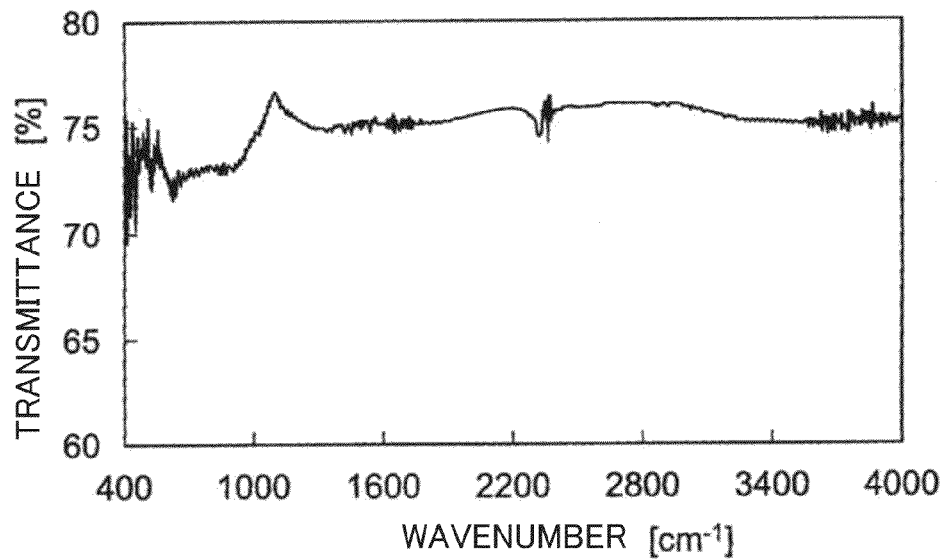
FIG. 5 is a graph showing the FT-IR spectrum measured for the red-violet residue in Example 1.

The organic phase was separated from the liquid ultimately obtained (right-hand vial in FIG. 4), and the solvent was removed by distillation, whereupon a red-violet residue was recovered. The FT-IR spectrum of this red-violet residue was measured, giving the results shown in FIG. 5. From the FT-IR measurement results for the red-violet residues, —OH stretching absorption from smectite was observed near 3320 $cm^{-1}$. Hence, the above red-violet residue was confirmed to be a composite of gold nanoparticles and smectite.

Comparative Example 1

Aside from the use, as the smectite, of hydrophilic smectite SWN from CO-OP CHEMICAL CO., LTD. that had not been subjected to lipophilizing treatment, ethyl acetate and an aqueous gold nanocolloid solution were added in turn to an ethanol solution of hydrophilic smectite under the same conditions as in Example 1. The gold colloid remained in the aqueous phase and was not observed to move into the organic phase. This demonstrated that the movement of gold colloid from the aqueous phase to the organic phase that was confirmed in Example 1 was brought about by lipophilizing treatment between the layers or at the surface of the smectite.

Example 2

Figure 6:
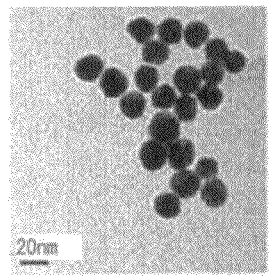
FIG. 6 is a transmission electron micrograph showing the gold nanoparticles in Example 2.

Aside from using instead $2.4 \times 10^{-4}$ M (0.56 wt %) $HAuCl_4 \cdot 4H_2O$, a gold nanocolloid solution was prepared by the same procedure as in Example 1. The transmission/absorption spectrum of this gold nanocolloid solution was measured, whereupon the plasmon absorption was 520 nm, based on which the diameter of the gold nanoparticles was assumed to be about 20 nm. In fact, when transmission electron microscopic examination of the gold nanoparticles was carried out, as shown in FIG. 6, the diameter of the particles was 20±2 nm.

Using this gold nanocolloid solution, a liquid that separated into an aqueous phase and an organic phase was obtained by the same procedure as in Example 1. As in Example 1, movement of the gold nanoparticles from the aqueous phase into the organic phase was confirmed at this time, and the color of the final organic phase was red-violet.

Example 3

Aside from changing the order in which the aqueous gold colloid solution and the ethyl acetate were added to the ethanol solution of 1 wt % smectite SPN, a liquid that separated into an aqueous phase and an organic phase was obtained in the same way as in Example 2.

Figure 7:
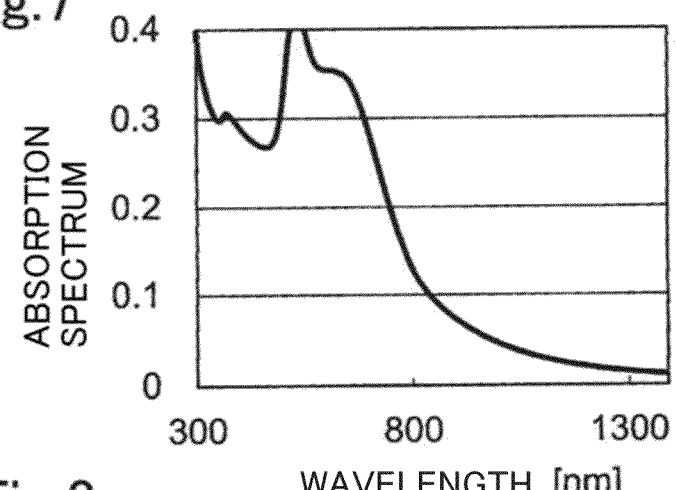
FIG. 7 is a graph showing the absorption spectrum measured for the organic phase in Example 3.

Specifically, 0.15 mL of an ethanol solution of 1 wt % smectite SPN was collected in a 100 mL screw-top vial, then first 50 mL of an aqueous gold colloid solution was added, giving a somewhat cloudy non-uniform dispersion. Next, 10 mL of ethyl acetate was added, after which the mixture was vigorously stirred for 30 seconds, then left to stand for 10 minutes. Movement of the gold nanoparticles from the aqueous phase into the organic phase was thereby confirmed, and the color of the final organic phase was blue-violet. The absorption spectrum of this organic phase was measured, whereupon, as shown in FIG. 7, broadening of absorption to the near-infrared region occurred, indicating that aggregation of the gold colloid had occurred.

Example 4

Figure 8:
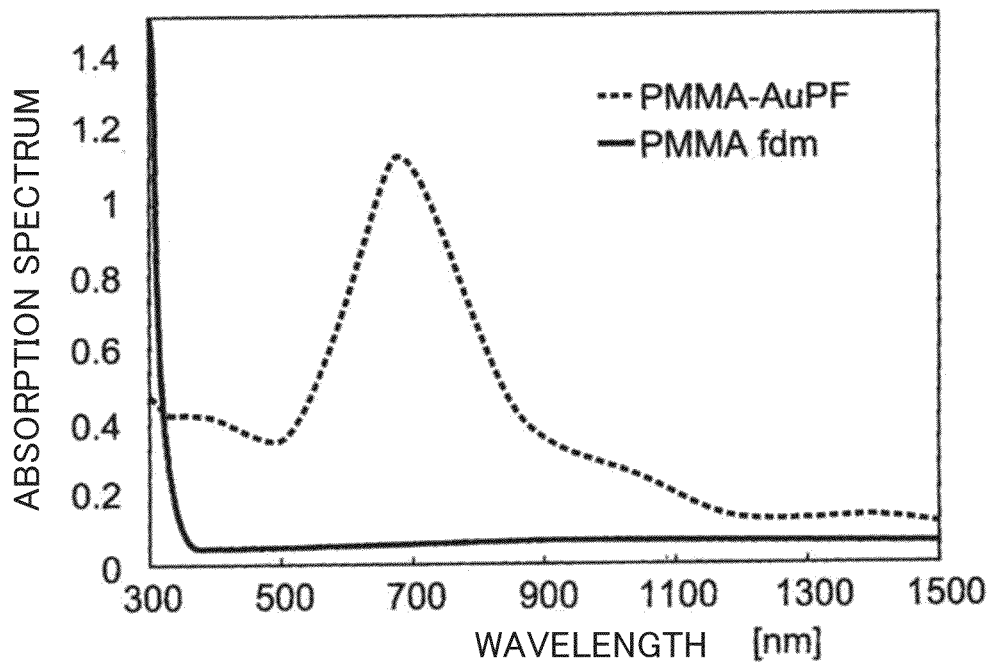
FIG. 8 is a graph showing the absorption spectrum measured for the film produced in Example 4.

Lipophilized synthetic smectite SAN available from CO-OP CHEMICAL CO., LTD. was dissolved in 10 mL of toluene to prepare a toluene solution having a smectite concentration of 0.05 wt %, and a uniform dispersion of fine particles was obtained by ultrasonic irradiation. Next, 50 mL of the same aqueous gold colloid solution as in Example 2 was added to this dispersion and extraction operations like those in Example 2 were carried out, giving a red organic phase. The operations of discarding the substantially colorless aqueous phase, freshly adding 50 mL of aqueous gold colloid solution and again extracting were repeated seven times, thereby concentrating the gold colloid in the organic phase. The concentrate was then held for 3 hours on a hot plate at 100° C. or above, thereby removing moisture from organic phase and giving a highly viscous red paste. To this paste was added 3 mL of a 0.1 g/L solution of polymethyl methacrylate (PMMA, from Aldrich Co.; number-average molecular weight, 44,700). The mixture was kneaded for a full day on a roll mill, after which it was coated onto a base film using a doctor blade, left to stand for 1 hour in a 100° C. oven to remove the solvent, then peeled from the base film, giving a transparent, blue-tinged film having a thickness of about 0.4 µm and measuring about 10 cm square in size. Upon measurement of the absorption spectrum for this film, as shown in FIG. 8, unlike the solution, a plasmon band was confirmed near 700 nm. Because the plasmon band had a large half-width value, it was apparent that aggregation between the particles had proceeded and that a distribution in the particle diameter had arisen. This signified that a photosensitizing wavelength region-expanding effect is obtainable without relying on dyes that may undergo photo-deterioration. This is advantageous in that, even in those cases where a dye is not used and which are directed at a high durability (weather resistance), a photosensitizing effect can be obtained over a broad wavelength range.

The transparent film was transferred onto a glass plate and the surface resistance was measured with a four-point probe, yielding a value of 50Ω/. This showed that the film can be used as a polarizable (dielectric) electrode.

Example 5

An aqueous silver nanocolloid solution was prepared as follows in accordance with a reference document (P. C. Lee et al, *J. Phys. Chem. B* (1982)). Next, 54 mg of $AgNO_3$ was dissolved in 300 mL of water, giving a colorless liquid. This was refluxed and boiled under degassing. Next, 6 mL of a 10 wt % aqueous solution of trisodium citrate was added. Several minutes later, the solution had turned yellow; after 15 to 20 minutes, the color of the solution turned yellowish-gray. Refluxing was subsequently continued, but because the color of the solution did not change, after about 1 hour had elapsed following trisodium citrate addition, refluxing was stopped and the solution was left to stand overnight then stored in a darkened state at room temperature. The transmission/absorption spectrum of the resulting aqueous silver colloid solution was measured, whereupon plasmon absorption was observed near 410 nm. In addition, upon examination of the silver nanoparticles with a transmission electron microscope, the diameter of the silver nanoparticles was found about 50 nm.

The above aqueous silver colloid solution (30 mL) was added to 2.5 mL of a 1 wt % acetone solution of lipophilized synthetic smectite STN available from CO-OP CHEMICAL CO., LTD., and a greenish-brown precipitate at once settled out. The precipitate was collected by filtration, washed with methanol and dried at room temperature, following which it was ultrasonically dispersed in γ-butyrolactone. This dispersion appeared green in color but was clear; no precipitation occurred even after 2 months of standing.

Comparative Example 2

Aside from the use, as the smectite, of the hydrophilic smectite SWN (from CO-OP CHEMICAL CO., LTD.) that had not been subjected to lipophilizing treatment, the experiment was carried out under the same conditions as in Example 5. No change whatsoever was observed in the aqueous silver colloid solution; a stable dispersed state was maintained. This showed that the settling out of the greenish-brown precipitate in Example 5 was brought about by lipophilizing treatment of the smectite.

Example 6

Figure 9:
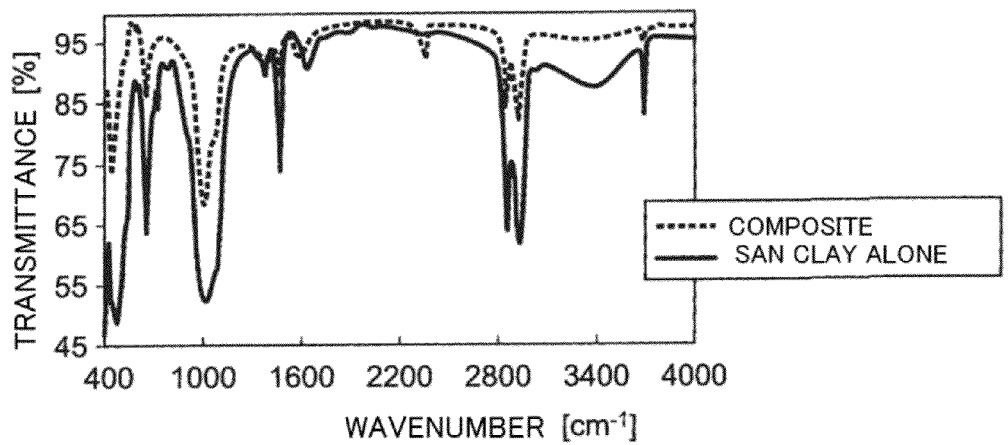
FIG. 9 is a graph showing the FT-IR spectrum measured for the colored powder obtained in Example 6.

First, 5 mL of a 1 wt % toluene solution of lipophilized synthetic smectite SAN (CO-OP CHEMICAL CO., LTD.) was added to 50 mL of the aqueous silver colloid solution prepared by the method described in Example 5, and the mixture was vigorously stirred then left to stand, whereupon it separated into an organic phase as the top layer and an aqueous phase as the bottom layer. The organic phase on top was colored green. Next, the organic phase was collected, the solvent was distilled off under reduced pressure and a large amount of methanol was added, whereupon a dark green precipitate formed. The precipitate was removed by filtration and dried at 60° C., giving a powder. The FT-IR spectrum of this colored powder was measured and compared with the FT-IR spectrum for the smectite SAN alone. As shown in FIG. 9, both had peaks at substantially the same wavenumbers. This showed that the colored powder was a composite of the lipophilized smectite and the silver colloid particles.

Example 7

A $10^{-4}$ mol/L ethanol solution of the coumarin-type cationic dye 7-N,N-dimethylamino-4-methylcoumarin (Coumarin 311, from Aldrich Co.; laser-grade) was prepared, an aqueous dispersion of montmorillonite (trade name, Kunipia F; from KUNIMINE INDUSTRIES CO., LTD.) was added to the solution, and the colored precipitate that formed was recovered. This colored precipitate was dried, then adjusted to a solids content of 10 wt % in acetone, and fine particle dispersion was carried out for 1 hour in a sand mill using 0.3 mm diameter zirconia particles as the grinding media. When the aqueous silver nanocolloid solution prepared in Example 5 was added dropwise to the resulting dispersion, a greenish-gray precipitate formed at once. This colored precipitate was collected, following which it was subjected, as a mixture of the weight composition indicated below, to roll mill treatment for a full day, yielding a beige-colored paste.

<Paste Composition>

| | |
|---|---|
| Silver nanocolloid-coumarin dye-modified montmorillonite composite | 125 parts by weight |
| Azobisisobutyronitrile | 3 parts by weight |
| Polyvinyl butyrate resin (Sekisui Chemical Co., Ltd.) | 25 parts by weight |
| Ethyl acetate | 100 parts by weight |

This paste was applied with a doctor blade onto a 100 μm thick polyethylene terephthalate (PET) film, then dried under heating at 100° C. for 5 minutes, giving a laminated film composed of a 1 μm thick light yellow-green cloudy layer formed on a base film. The total light transmittance of this thin-film, including the base film, was 47%. Next, this cloudy layer was laid on top of the anti-reflective coating of a silicon photodiode (S2386-18K, from HAMAMATSU PHOTONICS K.K.) and pressed under applied heat at 60° C. for 3 minutes, following which the base film was peeled off, forming a laminating layer on the photodiode. The photocurrent for this photodiode following such lamination was measured, and the ratio with respect to the photocurrent of a silicon photodiode to which lamination had not been carried out (photocurrent enhancement ratio) was determined. Transfer of the laminating layer onto the photodiode resulted in a photocurrent that was 1.5 times larger.

Example 8

Aside from using lipophilized synthetic mica (trade name, Somasif MPE, from CO-OP CHEMICAL CO., LTD.) instead of lipophilized synthetic smectite STN, the experiment was carried out in exactly the same way as in Example 5, giving a γ-butyrolactone dispersion of a Ag-synthetic mica composite. In a separate procedure, an aqueous solution of PEDOT:PSS was spin-coated onto the transparent electrode surface of an ITO/glass substrate, then dried so as to form a p-type conductive polymer (hole-transporting layer). The γ-butyrolactone dispersion of Ag-synthetic mica composite prepared above was spin-coated onto this p-type conductive polymer. In addition, a mixed solution of PCBM and P3HT (solvent: chromobenzene) was spin-coated thereon to form a photoelectric conversion layer, and finally an aluminum electrode was formed on the surface layer by vacuum vapor deposition, thereby giving an organic solar cell sample. The Ag-mica composite nanoparticle coverage on the surface of the transparent electrode in this sample was calculated to be 60%. In this sample, the composite nanoparticles had an average particle diameter d of about 55 nm, and the hole-transporting layer in places where there are no metal nanoparticles had a film thickness t of 40 nm.

The incidence photon to current efficiency (IPCE) of the above organic solar cell sample was measured. On comparing the IPCE values both in the presence and absence of a Ag-mica composite nanoparticle layer, it was found that providing a composite particle layer increased the IPCE 2.1-fold.

Example 9

The Ag-lipophilized smectite composite prepared in Example 6 was added to a mixed solution of PCBM and P3HT (solvent, chlorobenzene) in a ratio of 10 wt % with respect to the solids content of the latter, and ball mill dispersion was carried out. In a separate procedure, an aqueous solution of PEDOT:PSS was spin-coated onto the transparent electrode side of an ITO/glass substrate and dried, forming a p-type conductive polymer film (hole-transporting layer). The dispersion of Ag-lipophilized smectite composite, PCBM and P3HT prepared above was spin-coated onto this p-type conductive polymer, thereby forming a photoelectric conversion layer. Finally, an aluminum electrode was formed on the surface layer by vacuum vapor deposition, giving an organic solar cell sample.

The IPCE of this organic solar cell sample was measured. On comparing the IPCE values both in the presence and absence of a Ag-smectite composite nanoparticle layer, it was found that providing a composite particle layer increased the IPCE 1.5-fold.

Example 10

First, 4 μL of a dispersion containing 1 wt % of lipophilized synthetic smectite SAN (trade name) from CO-OP CHEMICAL CO., LTD. was added to 3 mL of a 0.1 g/L toluene solution of polymethyl methacrylate (abbreviation: PMMA; from Aldrich Co.; number-average molecular weight, 44,700) and the mixture was ultrasonically irradiated, giving a uniform mixed dispersion of fine particles. Next, extraction was carried out by adding to this dispersion a colloid solution prepared by the addition of 10 mg of trisodium citrate to the 50 mL of the aqueous gold colloid solution shown in Example 2, whereupon a metal colloid exhibiting a reddish-brown color concentrated at the interface between the aqueous phase and the organic phase. This was left to stand overnight at room temperature and the toluene in the top layer was removed by drying, after which a film having a golden luster separated from the sides of the screw-top vial and remained suspended in the aqueous phase. The screw-top vial was then held on a hot plate at 95° C. for 1 hour, giving a transparent, freestanding film (meaning that the condition of the film was such that it did not break up or deform when touched, and allowed handling as a film) that had a thickness of about 0.3 μm, a bluish tint while exhibiting a half-mirror like metallic luster, and a diameter of about 3 cm. This film was carefully transferred onto a glass plate, and the surface resistance at the surface of the aqueous phase side was measured by the four-point probe method. The resulting value of 4Ω/ indicated that use as a current-collecting electrode is possible. By contrast, the surface on the side open to the atmosphere exhibited a value of several MΩ/ or more, indicating that the electrical conductivity was anisotropic.

Comparative Example 3

Aside from not including lipophilized smectite SAN, the same exact procedure was carried out as in Example 10. In contrast with Example 10, no metal colloid whatsoever aggregated at the interface between the aqueous phase and the organic phase. The aqueous phase continued to exhibit the red color characteristic of the colloid, and the organic phase continued to be colorless. It is apparent from this that the aggregation of metal colloid at the interface which occurred in Example 10 was brought about by the addition of a small amount of lipophilized clay to the organic phase.

Figure 10:
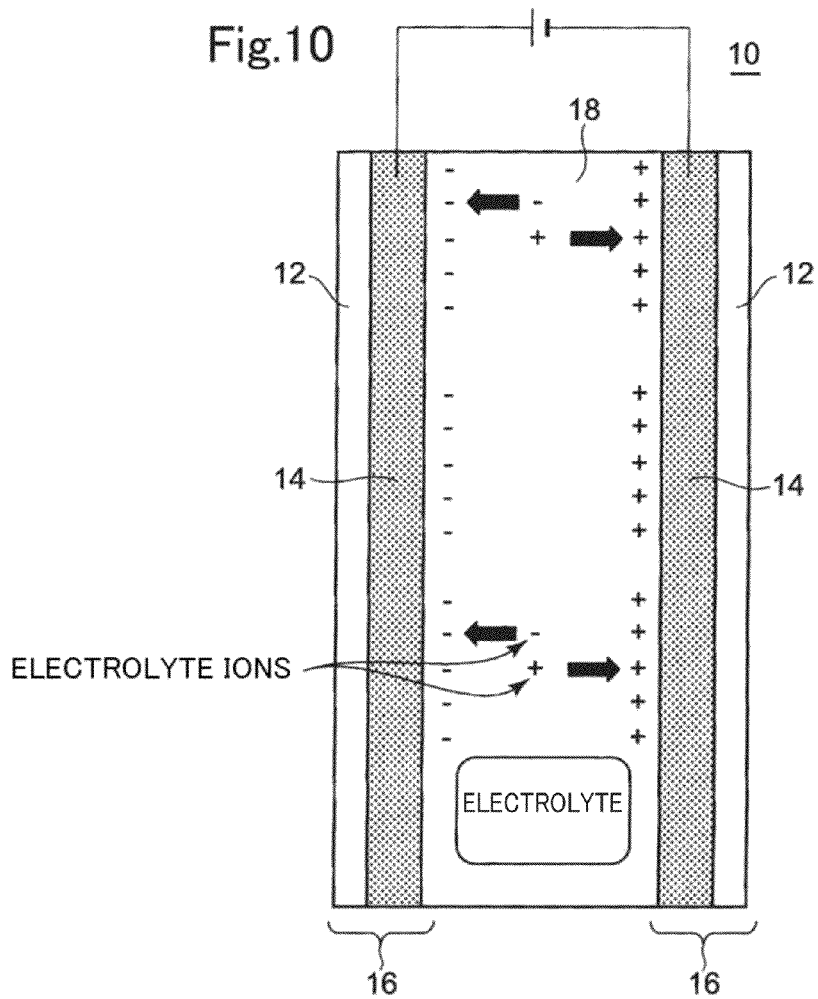
FIG. 10 is a diagram showing the construction of the electrical double-layer capacitor produced in Example 11.

Example 11

γ-Butyrolactone containing 0.3 M of tetraethylammonium chloride was impregnated into a separator for use in capacitors (thickness, about 50 μm; manufactured by NIPPON KODOSHI CORPORATION), and the Au current-collecting electrode film having a thickness of about 0.4 microns produced in Example 10 was pressure-bonded to both sides thereof, the conductive side of the film having been brought into contact with the separator in such a manner as to cover the impregnated liquid, thereby constructing an electrical double-layer capacitor. The construction is shown schematically in FIG. 10. As shown in FIG. 10, the electrical double-layer capacitor 10 has a construction in which the separator 18 is positioned between current-collecting electrode films 16, each of which is composed of a PMMA resin 12 and a gold current-collecting electrode 14.

Lead wires were brought into contact with both current-collecting electrodes of this electrical double-layer capacitor and, using a charger, a potential difference (DC) of 2.5 V was applied for 5 minutes at room temperature between the two electrodes while establishing electrical connection at the terminal Pt plate. A capacitance of several F/cm$^3$ was exhibited from the discharge curve at this time, demonstrating that this device operates as an electrical double-layer capacitor.

Example 12

First, 20 mL of the aqueous silver colloid solution shown in Example 5 was placed in a 50 mL screw-top vial. Next, a solution obtained by adding 5 μL of a dispersion containing 1 wt % of lipophilized synthetic smectite SAN (trade name; from CO-OP CHEMICAL CO., LTD.) to 3 mL of a toluene solution and dispersing the fine particles was added. The resulting mixture was vigorously shaken and left at rest, whereupon an interface having a golden luster formed between the aqueous phase and the organic phase. The clear, colorless organic phase and aqueous phase above and below the interface were collected with a pipette and discarded, following which the film having a metallic luster was transferred to a glass plate and dried at 100° C. for 1 hour, thereby forming a silver-colored film. This operation was repeated five times, and the surface resistance was measured with a tester, giving a result of 10 Ω/cm. This demonstrated that the film can be used as a current-collecting electrode.

Next, the scale was increased 50-fold and, in terms of volume, about 0.5 mL of interfacial metal film was collected from 1 liter of aqueous silver colloid solution by carrying out the same operations as above. This metal film was ultrasonically dispersed for 1 hour in 5 mL of a water-methanol (volume ratio, 1:7) mixed solvent, giving a green paste. Using a wiper bar, this paste was applied while wet onto a glass substrate to a thickness of about 5 μm, and hot-air dried at 100° C., yielding a lustrous film that was greenish-gray in appearance and had transparency. The surface resistance of the film was about 5 Ω/cm.

Example 13

Figure 11:
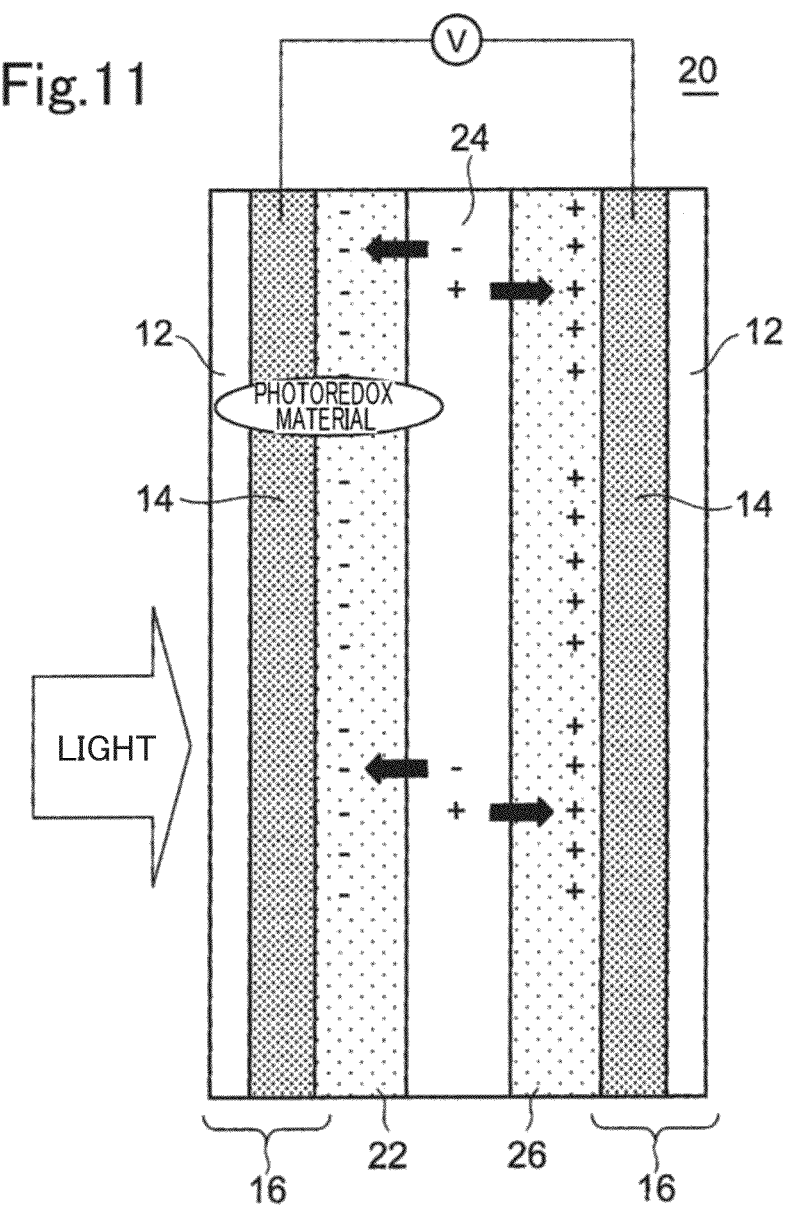
FIG. 11 is a diagram showing the construction of the photocapacitor having a 5-layer structure produced in Example 13.

A 35 wt % ethanol solution of lipophilized synthetic smectite SPN (trade name; CO-OP CHEMICAL CO., LTD.) was impregnated into a cellulose-based Millipore filter having a thickness of 90 μm and dried 2 hours at room temperature, thereby supporting the lipophilized clay and giving an insulating layer. Next, a liquid obtained by preparing an ethanol solution containing 70 wt % of BN composite resin (HIBORON BN-2, from Boron International Co., Ltd.), which is known as an antistatic resin, adding a compound (ZnP(6)V) of the following structure having photoredox properties in an amount of 0.02 mmol with respect to the resin component, and additionally mixing in the Ag-smectite composite dispersion prepared in Example 5 so that the content of the composite relative to the resin component becomes 10 wt % was applied as a photodielectric layer onto one side of the above insulating layer to a thickness when dry of 10 μm. A mixed layer of BN-composite resin (HIBORON BN-2) and Ag-smectite composite which contained none of the compound having photoredox properties was formed to the same thickness on the opposite side of the insulating layer, thereby forming a dielectric layer. Upon bringing a tester into contact with both interfaces of this photodielectric layer/dielectric layer, the resistance in the thickness direction was 20 kΩ. Blue-colored films (Au current-collecting electrode films) produced by the method described in Example 10 were stacked onto both sides of this dielectric layer, thereby creating the photocapacitor having a 5-layer structure shown schematically in FIG. 11. As shown in this diagram, the photocapacitor 20 is composed of, as successive layers from the light input side, a current-collecting electrode film 16, a photodielectric layer 22, an insulating layer 24, a dielectric layer 26, and a current-collecting electrode film 16. Next, when the photocapacitor 20 was irradiated from the light input side with 430 nm monochromatic light extracted from Xe light using a diffraction grating, a photocurrent of about 1 μA/cm$^2$ was momentarily observed, creating a photovoltaic power of about 0.2 V between both electrodes. Even when light irradiation was stopped, the potential was retained for at least 24 hours. Only when connected to an external circuit did the potential fall to 0.

<Structure of Compound ZnP(6)V Having Photoredox Properties>

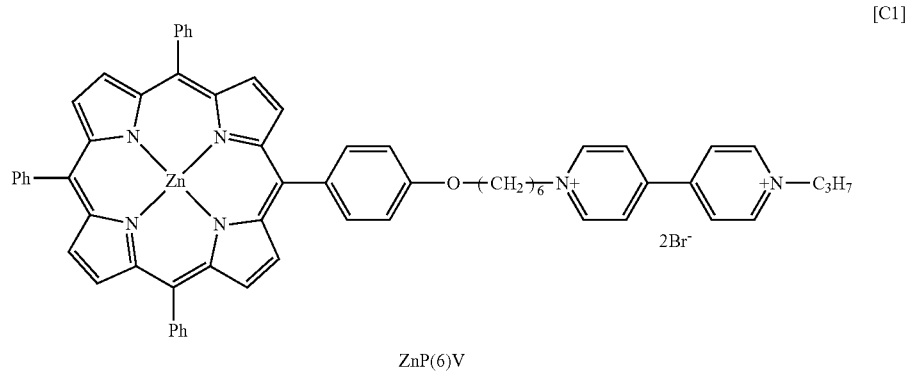

ZnP(6)V

Example 14

A thick paste was prepared by using a roll mill to knead the Ag-smectite composite obtained in Example 6 into a methyl ethyl ketone solution containing 70 wt % of BN-4 (a BN composite resin in the form of a solid) to a solids content of 30 wt %. Using a film formed by placing a 0.1 micron thick solid electrolyte membrane (NanoMembrane Technologies, Inc.) on aluminum foil, the above paste was applied to the surface on the solid electrolyte side and then heated at 100° C. for 1 hour. The paste was impregnated into the membrane and then cooled to room temperature. In addition, the transparent electrode film shown in Example 12 was laminated onto the side opposite from the aluminum foil and bonded under heat and pressure at 150° C., thereby giving a film-type solar cell having greater flexibility and a thickness on the order of several microns. The resistance value between both electrodes at room temperature was about 1 MΩ.

Figure 12:
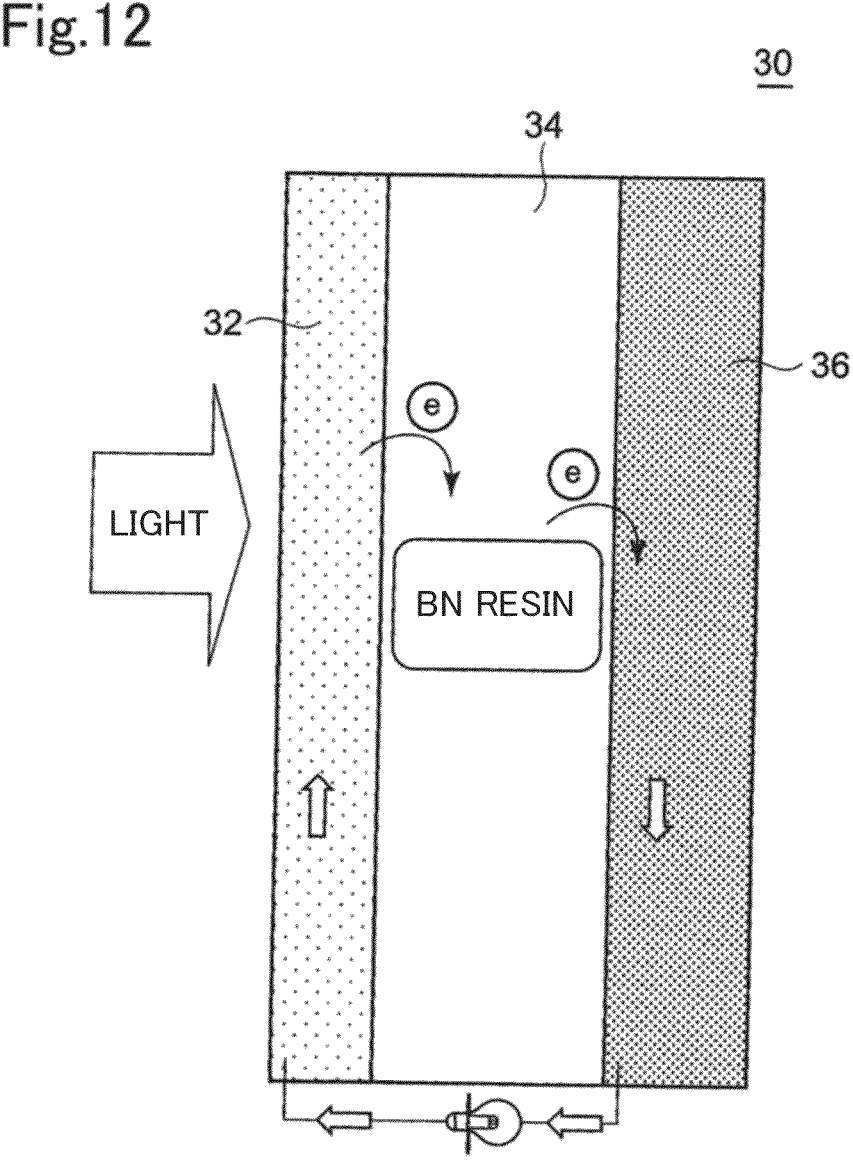
FIG. 12 is a diagram showing the construction of the film-type solar cell produced in Example 14.

FIG. 12 is a diagram showing the structure of the film-type solar cell produced in Example 14. As shown in the same diagram, the solar cell 30 has a structure composed of, as successive layers from the light input side, a silver current-conducting electrode (the transparent electrode film of Example 12) 32, a solid electrolyte membrane 34 impregnated with a paste containing the composite of Example 6, and aluminum foil 36.

When fully irradiated with Xe light at a light intensity of 0.3 W/cm$^2$ from the transparent electrode side, a cathodic photocurrent on the order of several mA/cm$^2$ was obtained.

Example 15

Figure 13:
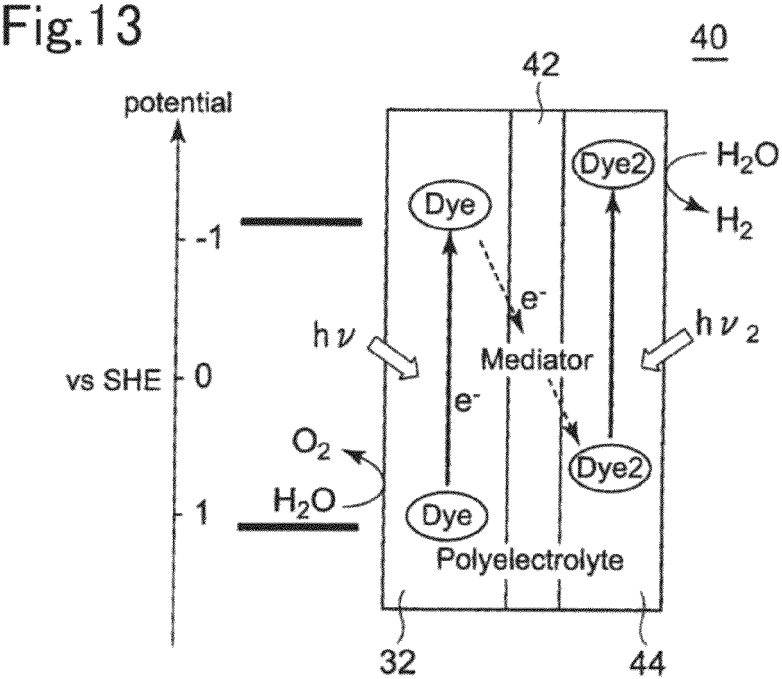
FIG. 13 is a diagram showing the construction of the water photolysis device produced in Example 15.

A uniform slurry solution was prepared by mixing together 10 wt % of the hydrophilic clay SWN(CO-OP CHEMICAL CO., LTD.), 3 wt % of a crosslinking agent (HIBORON B-1; Boron International Co., Ltd.) and 2 wt % of polyvinyl alcohol. A separator for use in capacitors (thickness, about 50 μm; NIPPON KODOSHI CORPORATION) was immersed for 15 minutes at room temperature in this slurry solution, then drawn out and hot-air dried. This paper-based ion-exchange material was again immersed for 1 hour in a 50 mM methyl viologen solution, then drawn out, washed with a copious amount of water and dried, thereby fixing the bipyridinium skeleton within the clay (solid electrolyte) by ion exchange. Next, the current-collecting electrode film of Example 12 was immersed for a full day in a THF solution containing 5 mM of the dyes mentioned below and thereby made to adsorb the dyes, following which the film was drawn out, excess dye was washed away with a copious amount of ethanol, and the film was bonded under heat (150° C.) and pressure to one side of the above porous layer-clay-viologen composite paper. Next, an ethanol solution containing 5 mM of the compound shown in Example 13 (ZnP(v)6) was added to a Pt colloid solution from Tanaka Kikinzoku (the solvent being toluene), after which this was thinly applied by brush to the opposite side of the above current-collecting electrode composite film and dried, giving a sample with the structure shown in FIG. 13. The photolytic device 40 shown in this diagram has a structure composed of, as successive layers, a silver current-collecting electrode (anode) 32 to which a dye (Dye 1) has been adsorbed, a solid electrolyte 42 in which methyl viologen has been fixed, and a platinum electrode (cathode) 44 containing the compound ZnP(6)V (Dye 2) having photoredox properties.

Figure 14:
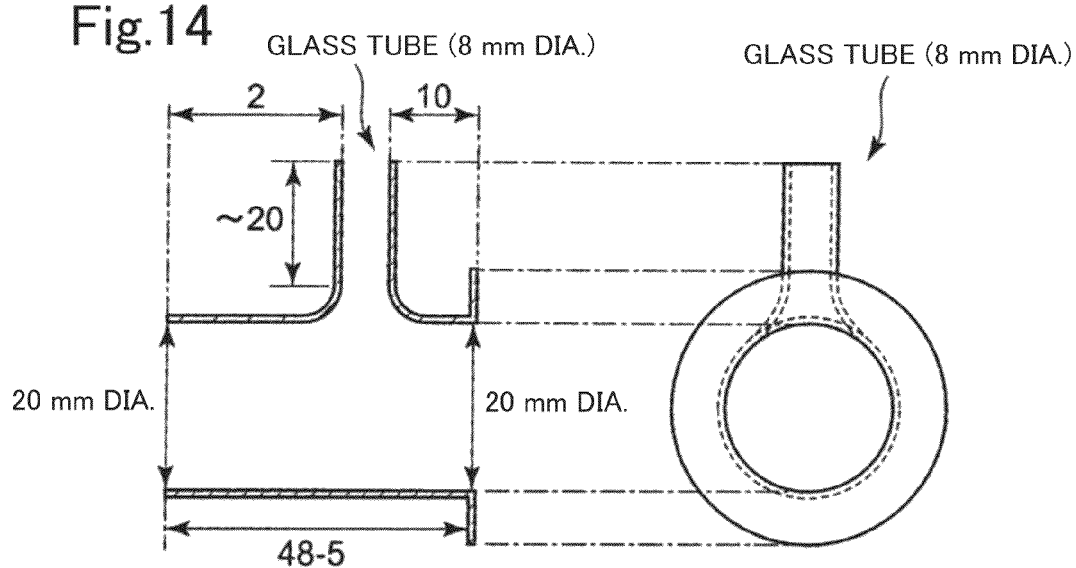
FIG. 14 is a diagram showing the construction of the reaction cell used in Example 15.

This photolytic device was placed at the center of a reaction cell having the structure (half) shown in FIG. 14, and water tanks on both sides were filled with distilled water. Next, both sides of the composite film at the center were irradiated with Xe light. Bubbles began forming at the interface between the film and water immediately after the start of irradiation, the amount of bubbles generated increasing with the passage of time. The gas that evolved was collected in a collection bottle and analyzed by gas chromatography, from which it was determined that oxygen formed on the Au electrode side and hydrogen formed on the Pt electrode side.

<Structure of Dye Adsorbed onto Ag Current-Collecting Electrode Film>

(SERS) which uses field enhancement effects at the surfaces of metal nanoparticles is possible.

[C2]

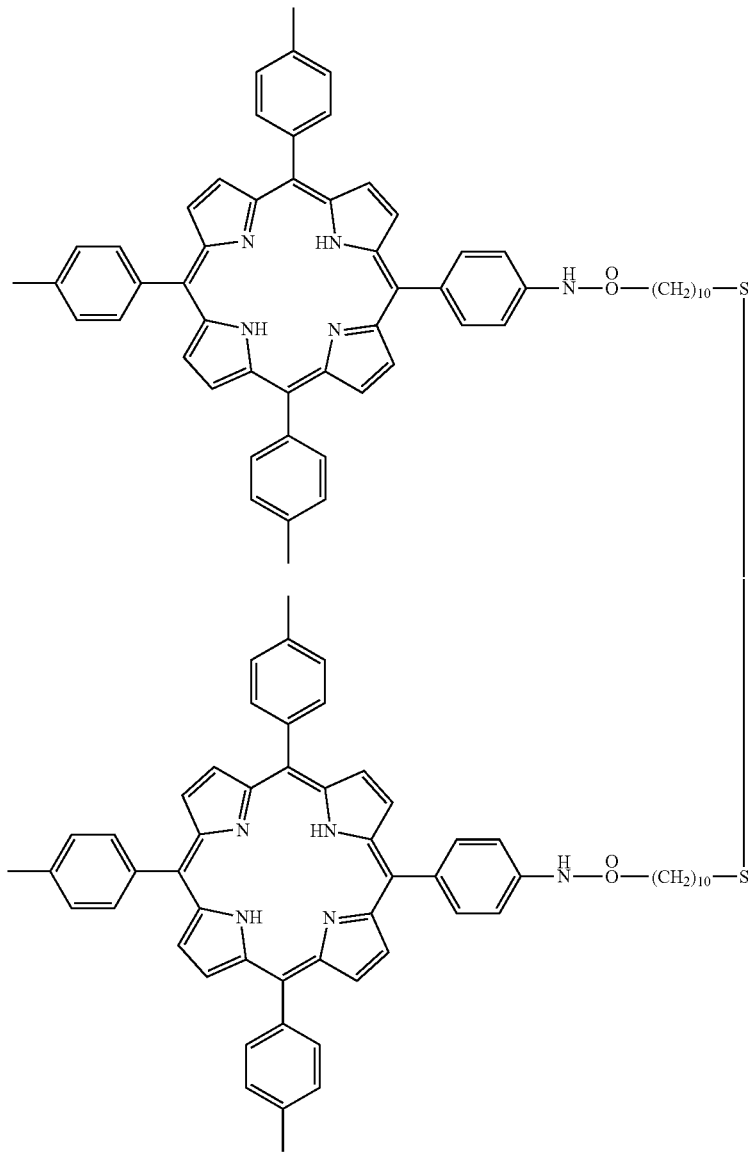

Example 16

Figure 15:
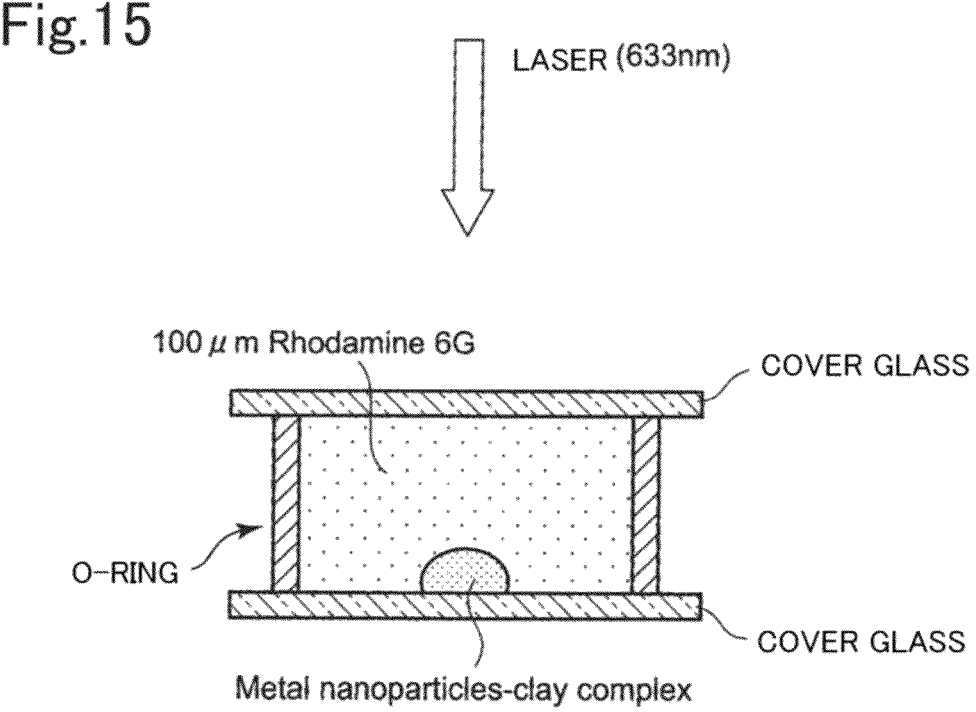
FIG. 15 is a diagram showing the construction of an experimental apparatus for observing Raman scattering in Example 16.

Very small amounts of the Au- and Ag-clay composite pastes produced respectively in Examples 1 and 5 were spotted onto cover glasses, then dried at 130° C. for 15 minutes, following which the periphery of each spot was filled with a nonaqueous solution of Rhodamine 6G (Kodak Co., laser-grade product) in the arrangement shown in FIG. 15. Irradiation was carried out from above with laser (He—Ne) laser light through glass, and Raman scattering at the surface was observed.

Figure 16:
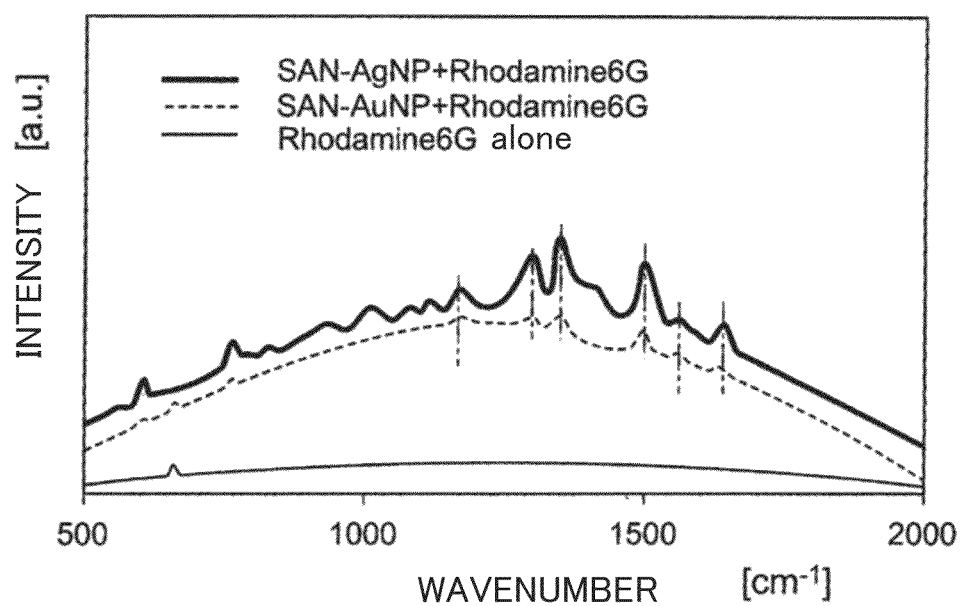
FIG. 16 is a graph showing the results of Raman scattering observations in Example 16.

The results are summarized in FIG. 16. It is clear that, compared with the use of Rhodamine dye alone, Raman scattering at the surface of the metal-clay composite was markedly enhanced within an organic solvent, demonstrating that application to surface-enhanced Raman spectroscopy

Summary of Examples

Next, the relationship between the conditions of the formation of a layered compound-metal particle composite and the manner in which the formation of the composite arises is summarized for the above examples. FIG. 17 is a table showing the relationship between the composite formation conditions and the composite forming phenomena for the working examples and comparative examples in which layered compound-metal particles composites were produced.

As shown in FIG. 17, in Examples 1 to 8, 10 and 12, an organically modified layered compound lipophilized by the intercalation of organic ions was used, and a nonaqueous solvent which is a poor solvent for a metal colloid and has an excellent ability to swell the organically modified layered compound was added together with an aqueous colloidal metal solution. As a result, the formation of a composite of the organically modified layered compound and the metal colloid proceeded, giving a layered compound-metal particle composite. In Examples 1 to 8, and 12, the difference in solubility parameter (SP) between the metal colloid and the nonaqueous solvent was at least 21 MPa$^{1/2}$. The method used to calculate the difference in SP values is described later.

In Comparative Examples 1 to 3 in which a layered compound that had not been lipophilized was used (or a layered compound itself was not used), the formation of a composite of the layered compound and the metal colloid did not proceed.

In Examples 1 to 4, 10 and 12 wherein ethyl acetate or toluene, which have very small polarities, were used as the nonaqueous solvent, a mixed solvent of an aqueous colloidal metal solution and a nonaqueous solvent (and an amphiphatic solvent) separated into an aqueous phase and an organic phase, and one of the following phenomena was confirmed: either the composite moved into the organic phase, or a condensed layer of the composite formed between the aqueous phase and the organic phase. In Examples 5 to 8 wherein acetone or ethanol, which have large polarities compared with ethyl acetate and toluene, were used as the nonaqueous solvent, phase separation of the mixed solvent of the aqueous colloidal metal solution and the nonaqueous solvent was not observed and precipitation of the composite was confirmed.

That is, these cases divide into, depending on the nonaqueous solvent added, cases in which there arises phase separation into an organic phase that stably disperses a large amount of composite and an aqueous phase that contains substantially no composite (Examples 1 to 4, 10 and 12), and cases in which the composite settles out and precipitates in a state where all the solvents are uniformly compatible. In the former case, because a suspension of the composite stably dispersed in the nonaqueous solvent making up the organic phase is directly obtained, the subsequent process (following dispersion of the composite in the organic solvent, a functional film is formed by coating) is simplified, which is efficient.

In Examples 1 to 3 where, in addition to the nonaqueous solvent, ethanol was added as an amphiphatic solvent, the formation of a composite of the metal colloid and the lipophilized layered compound was promoted. Hence, in cases where an amphiphatic solvent is added rather than using only a nonaqueous solvent, formation of the composite is thought to proceed as follows.

When an amphiphatic solvent that is relatively compatible with water is mixed with an aqueous colloidal metal solution, the mixed solvent of water and the amphiphatic solvent causes swelling between the layers of the organically modified layered compound or adsorbs onto the surface. Hence, presumably, the metal particles are present not only within the bulk mixed solvent, but also between the layers or at the surface of the organically modified layered compound. Moreover, by further adding a nonaqueous solvent to this mixed solvent, water is removed from between the layers or the surface of the organically modified layered compound, both of which are hydrophobic. As a result, it is thought that the bulk mixed solvent separates into an aqueous phase and an organic phase, and that the layered compound-metal particle composite moves into the organic phase having a high affinity therewith.

[Method for Calculating Difference in Solubility Parameters (SP)]

The method of calculating the "SP difference" in FIG. 17 is explained here. The SP values (MPa$^{1/2}$) for nonaqueous solvents used were 18.6 for ethyl acetate, 18.2 for toluene, and 20.3 for acetone. The solubility parameters of metal colloids in aqueous colloidal metal solutions were calculated from their solubilities in reference solvents (water, ethanol, methanol) by the procedure shown below and based on the following assumptions.

Assumption 1: The solubility parameters for the metal colloids are the same as the solubility parameter for trisodium citrate, which is a surface modifier (dispersant).

Assumption 2: The solubility parameters have additivity.

The solubility in water of the dispersant trisodium citrate dihydrate is 720 g/L (25° C.), from which the solubility at laboratory temperature (16° C.) was estimated to be 500 g/L. Moreover, it was confirmed that 500 g of trisodium citrate dihydrate dissolves completely in 1 liter of water.

Mixed solvents were prepared by mixing together water and ethanol in a mixing ratio (water:ethanol) of 9:1 (Mixed Solvent 1), or in a mixing ratio (water:ethanol) of 8:2 (Mixed Solvent 2). Next, trisodium citrate dihydrate was dissolved in these Mixed Solvents 1 and 2 to a concentration of 500 g/L. As a result, substantially all of the trisodium citrate dihydrate dissolved in Mixed Solvent 1, with only a very small portion precipitating, whereas most precipitated in Mixed Solvent 2.

Similarly, mixed solvents were prepared by mixing together water and methanol in a mixing ratio (water:methanol) of 9:1 (Mixed Solvent 3), or in a mixing ratio (water:methanol) of 8:2 (Mixed Solvent 4). Next, trisodium citrate dihydrate was dissolved in these Mixed Solvents 3 and 4 to a concentration of 500 g/L. As a result, all of the trisodium citrate dihydrate dissolved in Mixed Solvent 3, whereas a small portion precipitated in Mixed Solvent 4.

Based on these results, the solubility parameters for trisodium citrate were estimated as follows from the known solubility parameters of water, ethanol and methanol. The solubility parameters used for water, ethanol and methanol were respectively 47.9 MPa$^{1/2}$, 26.0 MPa$^{1/2}$ and 29.7 MPa$^{1/2}$.

$$SP \text{ for trisodium citrate}=0.9\times(SP \text{ of water})+0.1\times(SP \text{ of ethanol})=45.7$$

$$SP \text{ for trisodium citrate}=0.8\times(SP \text{ of water})+0.2\times(SP \text{ of methanol})=44.3$$

The SP of trisodium citrate, i.e., the SP of the metal colloid, was then obtained as the average of the SP estimated by the ethanol method (45.7) and the SP estimated by the methanol method (44.3), or 45.0 MPa$^{1/2}$.

EXPLANATION OF REFERENCE NUMERALS

1 Organically modified layered compound
2 Aqueous colloidal metal solution
3 Layered compound-metal particle composite
10 Electrical double-layer capacitor
12 PMMA resin
14 Au current-collecting electrode
16 Current-collecting electrode film
18 Separator
20 Photocapacitor
22 Photodielectric layer
24 Insulating layer
26 Dielectric layer
30 Solar cell
32 Ag current-collecting electrode
34 Solid catalyst film
36 Al foil
40 Photolysis device
42 Solid electrolyte
44 Pt electrode

The invention claimed is:

1. A method of producing a composite of a layered compound and metal particles, comprising the steps of:
    forming an organically modified layered compound by intercalating organic ions between layers of the layered compound; and
    adding to the organically modified layered compound an aqueous colloidal metal solution in which the metal particles are dispersed as a metal colloid in water and a nonaqueous solvent which is a poor solvent for the metal colloid and has an excellent ability to swell the organically modified layered compound.

2. The layered compound-metal particle composite production method according to claim 1, wherein the nonaqueous solvent has a solubility parameter difference with the metal colloid of at least 9 $MPa^{1/2}$.

3. The layered compound-metal particle composite production method according to claim 1 or 2 wherein, in addition to the nonaqueous solvent and the aqueous colloidal metal solution, an amphiphatic solvent having excellent affinity to both the water acting as a solvent in the aqueous colloidal metal solution and to the nonaqueous solvent is also added to the organically modified layered compound.

4. The layered compound-metal particle composite production method according to claim 3, wherein the nonaqueous solvent has a lower dielectric constant than the amphiphatic solvent.

5. The layered compound-metal particle composite production method according to claim 1 or 2, wherein the metal particles include at least one from among gold, silver, copper, aluminum and platinum.

6. The layered compound-metal particle composite production method according to claim 1 or 2, wherein the organic ions are of at least one type from among sparingly water-soluble or water-insoluble quaternary ammonium salts, phosphonium salts, fluorescent cationic dyes and oxonium salts.

7. The layered compound-metal particle composite production method according to claim 1 or 2, wherein the layered compound is a layered clay compound belonging to the montmorillonite group of minerals or the mica group.

8. A layered compound-metal particle composite obtained by the method according to claim 1.

9. A layered compound-metal particle composite suspension comprising:
    the layered compound-metal particle composite according to claim 8; and
    an organic solvent as a dispersion medium for the layered compound-metal particle composite.

10. The layered compound-metal particle composite suspension according to claim 9, further comprising at least one from among an organic dye, a hole transporting material, a p-type semiconductive material, an electron transporting material, an n-type semiconductive material and a crosslinkable material.

11. A layered compound-metal particle composite thin-film which is obtained by coating a surface thereof with the layered compound-metal particle composite suspension according to claim 9 or 10.

12. A layered compound-metal particle composite multilayer functional film comprising a stack of layers which include a plurality of the layered compound-metal particle composite thin-films according to claim 11, the plurality of layered compound-metal particle composite thin films having mutually differing properties.

13. The layered compound-metal particle composite multilayer functional film according to claim 12 which includes:
    an insulating layer composed of a layered compound-metal particle composite thin-film having a surface resistance of at least 100 kΩ/;
    a pair of dielectric layers composed of layered compound-metal particle composite thin-films having a surface resistance of at least 1 kΩ/ but less than 100 kΩ/ and disposed, respectively, on a surface side and a back side of the insulating layer; and
    current-collecting electrode layers composed of layered compound-metal particle composite thin-films having a surface resistance of not more than 10 Ω/ and disposed as surfacemost layers.

14. The layered compound-metal particle composite multilayer functional film according to claim 13, wherein a dye for photoelectric conversion is added to one of the current-collecting electrode layers and a layer adjacent thereto.

15. The layered compound-metal particle composite multilayer functional film according to claim 14, wherein an electron acceptor that is photoreduced by the dye is added to the insulating layer or to the insulating layer and the dielectric layers.

16. The layered compound-metal particle composite multilayer functional film according to claim 13 which has a symmetrical layered structure divided by the insulating layer, wherein
    two photoelectric conversion dyes having spectral sensitivities or light absorption wavelength maxima mutually differing by at least 20 nm are added, one dye being added to one of the current-collecting electrode layers and a layer adjacent thereto, and the other dye being added to the other current-collecting electrode layer and a layer adjacent thereto.

17. The layered compound-metal particle composite multilayer functional film according to claim 16, wherein
    the layered compound-metal particle composite multilayer functional film stacked on one side of the insulating layer includes platinum particles as the metal particles, and
    the layered compound-metal particle composite multilayer functional film stacked on the other side of the insulating layer includes particles of at least one of gold, silver, copper and aluminum as the metal particles.

18. A flexible solar cell comprising:
    a first electrode which is a dielectric layer or a solid electrolyte layer composed of the layered compound-metal particle composite multilayer functional film according to claim 12 and having a metal particle content of less than 50 wt %; and
    a second electrode which is a carbon fiber electrode.

19. A composite which is comprised of metal particles and an inorganic material or an inorganic-organic hybrid compound that adsorbs the metal particles and which can maintain a dispersed state within a nonaqueous solvent, a paste which is a high-concentration dispersion thereof, and a thin-film and a stacked structure of two or more thin-films formed from the paste.

20. The composite, the paste which is a high-concentration dispersion thereof, and the thin-film and the stacked structure of two or more thin-films formed from the paste according to claim 19, wherein the electrical conductivities, plasmon resonances or optical absorption characteristics thereof are controlled in accordance with the content and degree of aggregation of the metal particles.

* * * * *